Oct. 2, 1945. R. R. CLARKE 2,385,774
SNAP FASTENER
Filed May 20, 1944
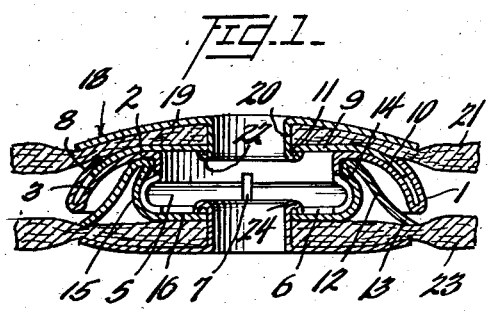
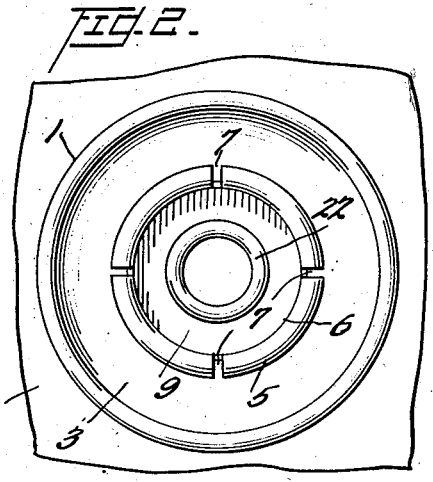
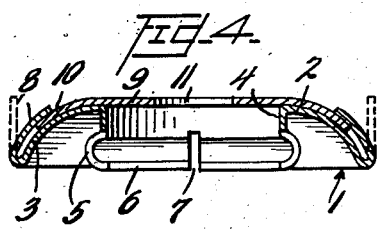
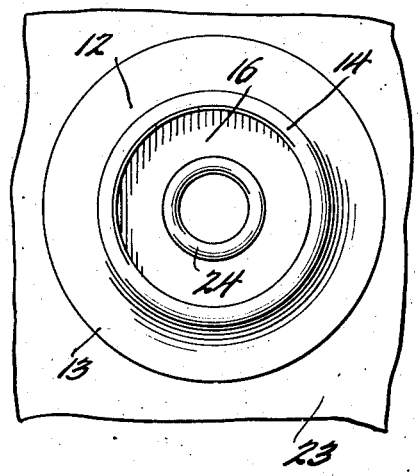
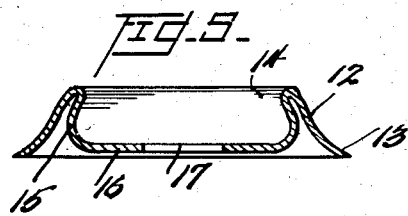
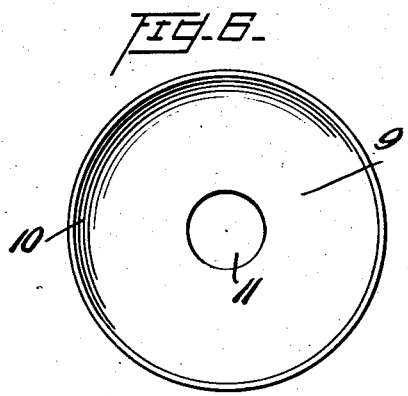
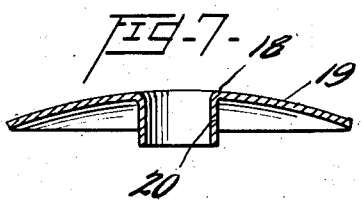
Inventor
Rollin R. Clarke,
By Parker Cook.
Attorney Patented Oct. 2, 1945

2,385,774

UNITED STATES PATENT OFFICE 2,385,774

SNAP FASTENER

Rollin R. Clarke, Waterbury, Conn., assignor to The Patent Button Company, Waterbury, Conn., a corporation of Connecticut Application May 20, 1944, Serial No. 536,555

1 Claim. (Cl. 24—217)

My invention relates to new and useful improvements in snap fasteners and has for an object to provide a fastener consisting of a socket member and a stud member, the socket member being formed of a single piece of metal and the stud member formed of but two pieces of metal.

Both the stud member and the socket member are fastened to their respective carrying mediums by an eyelet, which eyelet may be used either with the stud member or a socket member so that in the manufacture of the snap fastener there are but four different pieces to be shaped, one being the eyelet, which may be used for either the socket member or the stud member, the socket formed of one piece and the stud member formed of two pieces, thus making for an economical construction.

Still another object of the invention is to provide a snap fastener which is strong and efficient in service and wherein each part, that is, the socket member and the stud member are held in place by eyelets that are headed in position. Also, both the socket and the eyelet are so made that the heading tool may easily pass through the socket and/or the stud member to clench the respective parts to their respective carrying mediums.

Still another object of the invention is to provide a snap fastener that may be readily separated by an intentional pull, and on the other hand, will snap with a loud click when the parts are fastened, showing the user that the fasteners are in their closed or locked position.

With these and numerous other objects in view, the invention consists in certain new and novel arrangements as will be hereinafter more fully described and pointed out in the claim.

Referring now to the drawing showing the preferred embodiment:

Fig. 1 is a sectional view on an enlarged scale showing the stud and socket member in locked engagement and secured to their respective carrying mediums, Fig. 2 is a bottom plan view of the stud member, Fig. 3 is a top plan view of the socket member held to its carrying medium by an eyelet, Fig. 4 is a sectional view of the stud member, the dotted lines showing the peripheral edge before it is bent over the holding plate, Fig. 5 is a sectional view of the socket member, Fig. 6 is a bottom plan view of the holding plate that fits within the socket member, and Fig. 7 is a sectional view of an eyelet before being headed.

Referring now to the several views and to Figs. 1 and 4 for the moment, there is shown the stud member 1 which is formed of metal having the desired thickness and other characteristics that go to make up a snap fastener stud having a certain amount of resiliency.

It will be seen that this member consists of the body plate 2 which is curved downwardly and outwardly as at 3, while centrally of the same there is pressed or formed the downwardly extending cylindrical wall 4 at the lower end of which is a semi-circular shaped portion or annulus to form the head or ball 5.

The bottom of the ball 5 is open as at 6 while the walls of the annulus 5 and the cylindrical wall 4 are slotted as at 7 so that when this head or ball 5 is fitted into the socket member 12, which is several thousandths in diameter less than the external diameter of the head of the stud, the several sections of the ball 5 will be compressed and snap into the socket 12. On the other hand, the head will again be compressed as the stud is pulled from its socket as will be understood.

The outer peripheral portion 8 of the body portion 2 is first bent up to the dotted line position as shown in Fig. 4 so that the top plate 9 which has the outwardly extending dished portion 10, may be placed in position and then the rim 8 bent backwardly to tightly grip this plate 9 in place.

This holding plate 9 is also provided centrally with the opening 11 as it is within this opening that the eyelet about to be mentioned is passed and then headed.

Thus, it will be seen that the stud member consists of only 2 parts, that is, the body 2 which may be easily stamped and rolled into form, and the top plate 9 which is readily assembled and clamped into position to thus form the complete stud member.

Referring now to Fig. 5, it will be seen that the socket member 12 is also exceedingly simple in construction, it having a slightly flared rim 13 that extends upwardly to the top of the socket 14, and here the metal is bent back on itself as at 15 and is slightly arcuated or cupped corresponding in circular outline to the annulus 5 of the stud member.

The bottom wall 16 extends in a horizontal position and is provided with a central opening 17.

As heretofore, mentioned, the diameter of the mouth 12′ of the socket member 12 is less than the external diameter of the head of the stud so that the stud will be constricted as it is forced into its socket member.

Referring now for the moment to Fig. 7, there is shown an eyelet 18 which has a relatively large integral head or plate 19 which is slightly dished in cross section and has the center cylindrical wall 20. The diameter across the head is substantially the diameter across the socket member and just slightly less than the diameter across the body of the stud member. By providing a head of this size there is plenty of gripping surface to the cloth and it will be understood that if desired, a trade mark or insignia or other indicia might be stamped in this head.

Now to secure the stud member 1 to its carrying medium 21, the eyelets 18 will be fed in an attaching machine (not shown) to an anvil or attaching station and the stud members will also be fed to the same station, while between the two parts will be positioned the cloth 21.

A heading pin or die may then be passed through the bottom opening in the stud and after the cylindrical wall 20 has cut a hole in the cloth 21 and passed through the opening 11 in the plate of the stud member, the bottom edge 22 of the eyelet will be rimmed or headed as may be clearly seen in Fig. 1.

The stud member is now tightly clamped between the head of the eyelet 18 and the surface of the plate 9 of the stud member.

In a like manner, it is a simple matter to secure the socket member 13 to its carrying medium 23, as after the eyelet 18 has been passed through its cloth and through the opening 17 of the socket member, it will be headed as may be seen at 24 in Fig. 1.

From the foregoing it will be seen that the snap fastener above described is one that may be easily and readily manufactured and presents no difficult problems in attaching as both the stud 1 and the socket 12 member may be readily secured to their carrying mediums by passing the eyelets 18 through the receptive openings and then heading the eyelets.

In use, the stud member 1 will quickly and readily snap within its socket 12 and until intentionally removed by tilting one member the respect to the other, there is little possibility of the parts becoming separated. Also, by providing an eyelet 18 with the relatively large head there is little likelihood of the socket 12 or stud 1 being torn away from its cloth even after long usage.

Many slight changes might be made without in any way departing from the spirit or scope of the invention.

Having thus described my invention what I claim as new and desire to secure by Letters Patent is:

In a snap fastener including a stud member, said member comprising a body portion having a downwardly and outwardly flared rim, a perforated holding plate slightly less in diameter mounted on the said body portion and the metal of the flared rim bent back on itself clamping said plate in position, a central dependent cylindrical wall in the body portion, the lower portion of the wall provided with a projecting annulus semicircular in cross section and the annulus provided with a plurality of spaced slots, an eyelet adapted to be forced through a carrying medium and headed against the inner surface of said aforementioned plate.

ROLLIN R. CLARKE.